United States Patent
Moradnia et al.

(10) Patent No.: US 11,945,423 B2
(45) Date of Patent: Apr. 2, 2024

(54) AIR GUIDE DUCT FOR VEHICLE

(71) Applicant: Honda Motor Co., Ltd., Tokyo (JP)

(72) Inventors: Pirooz Moradnia, Dublin, OH (US);
Benjamin Bowlby, Dublin, OH (US);
Brian R. Reynolds, Dublin, OH (US);
David Wayne Halt, Marysville, OH (US); Jason Widmer, Marysville, OH (US); Matthew L. Metka, Plain City, OH (US); Pratap Thamanna Rao, Columbus, OH (US); Pubudu C. Abeysinghe, Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 16 days.

(21) Appl. No.: 17/715,301

(22) Filed: Apr. 7, 2022

(65) Prior Publication Data
US 2023/0322193 A1    Oct. 12, 2023

(51) Int. Cl.
*B60T 5/00* (2006.01)
*B60K 11/08* (2006.01)
*F16D 65/847* (2006.01)
*F01P 5/06* (2006.01)

(52) U.S. Cl.
CPC .............. *B60T 5/00* (2013.01); *B60K 11/08* (2013.01); *F16D 65/847* (2013.01); *F01P 5/06* (2013.01)

(58) Field of Classification Search
CPC . B60T 5/00; B60K 11/08; B60K 11/00; F16D 65/847
See application file for complete search history.

(56) References Cited

U.S. PATENT DOCUMENTS

| | | | |
|---|---|---|---|
| 5,495,909 A | 3/1996 | Charles | |
| 8,474,557 B2 | 7/2013 | Wolf | |
| 9,751,379 B2 | 9/2017 | Weiss et al. | |
| 11,725,569 B1 | 8/2023 | Abeysinghe et al. | |
| 2005/0217907 A1* | 10/2005 | Madson | B60K 11/04 180/68.1 |
| 2012/0071075 A1 | 3/2012 | Wolf | |
| 2012/0318476 A1* | 12/2012 | Begleiter | B60T 5/00 165/51 |
| 2016/0272258 A1* | 9/2016 | Gibson | B62D 37/02 |
| 2019/0118874 A1* | 4/2019 | Ibañez Moreira | F16D 65/807 |

FOREIGN PATENT DOCUMENTS

| | | |
|---|---|---|
| DE | 102008039728 A1 | 3/2010 |
| DE | 102010037614 A1 | 3/2012 |
| DE | 102012009909 A1 | 11/2013 |
| KR | 20210056795 A | 5/2021 |
| WO | 2011023875 A1 | 3/2011 |

* cited by examiner

*Primary Examiner* — Syed O Hasan
(74) *Attorney, Agent, or Firm* — Plumsea Law Group, LLC

(57) ABSTRACT

A motor vehicle having a front end, a pair of opposing front wheel wells rearward of the front end, and an air guide duct having at least one air inlet disposed forward of the front wheel wells and facing the front end of the motor vehicle. The air guide duct also has at least one air outlet opening into at least one of the front wheel wells such that incoming air from the front end of the motor vehicle is guided into at least one of the front wheel wells.

20 Claims, 11 Drawing Sheets

AIR GUIDE DUCT FOR VEHICLE

BACKGROUND

1. Field of the Disclosure

The present disclosure relates to an air guide duct for a vehicle and, more particularly, to an air guide duct configured to guide and discharge cooling air flow into at least one wheel well.

2. Description of Related Art

Motor vehicles as known in the art generally include a heat exchanger or radiator system and a cooling fan assembly to draw cooling air through the same.

Radiator ducts used in some high performance or race vehicles have been designed to direct the discharge airflow from the cooling fan assembly through the hood of the vehicle. This type of prescribed air flow path is beneficial because it isolates the cooling system air flow and prevents it from unnecessarily contacting components within the engine compartment. Hence, the radiator duct can reduce air flow resistance to thereby improve aerodynamic drag as well as increase the air mass flow through the radiator system. However, such radiator ducts have also required a sizable amount of dedicated space within the engine compartment of the vehicle and, in the case of those discharging through the hood, substantially impact the overall design and aesthetics of the vehicle.

There is a need in the art for an air guide duct system and method configured to efficiently guide and discharge cooling air flow through a radiator system without impacting the exterior styling of the vehicle or requiring an unduly amount of space under the hood.

SUMMARY OF THE INVENTION

The disclosure herein provides an aero-thermal duct, or more particularly, an air guide duct to improve the both the aerodynamics and thermodynamics of a motor vehicle without impacting the aesthetics or exterior styling of the vehicle.

In one aspect, the disclosure provides a motor vehicle having a front end, a pair of opposing front wheel wells rearward of the front end, and an air guide duct having at least one air inlet disposed forward of the front wheel wells and facing the front end of the motor vehicle. The air guide duct also has at least one air outlet opening into at least one of the front wheel wells such that incoming air from the front end of the motor vehicle is guided into at least one of the front wheel wells.

A system and method for guiding air flow through a front end of a motor vehicle is also disclosed, including discharging air flow from at least one fan assembly into an air guide duct, directing air flow from at least one air inlet of the air guide duct, through a body of the air guide duct, and towards at least two opposing air outlets of the air guide duct, and discharging air flow from each of the at least two opposing air outlets into a respective wheel well of the motor vehicle.

In another aspect, the disclosure provides an air guiding system for a motor vehicle having a pair of opposing front wheel wells is also disclosed. The air guiding system includes an air guide duct having at least one air inlet defining a first air flow dimension and configured to be disposed forward of the front wheel wells, a first air outlet and an opposing second air outlet each defining a second air flow dimension. The first air outlet is configured to discharge air into one of the front wheel wells and the second air outlet is configured to discharge air into the other front wheel well such that incoming air is guided into the pair of opposing front wheel wells.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Figure 1:
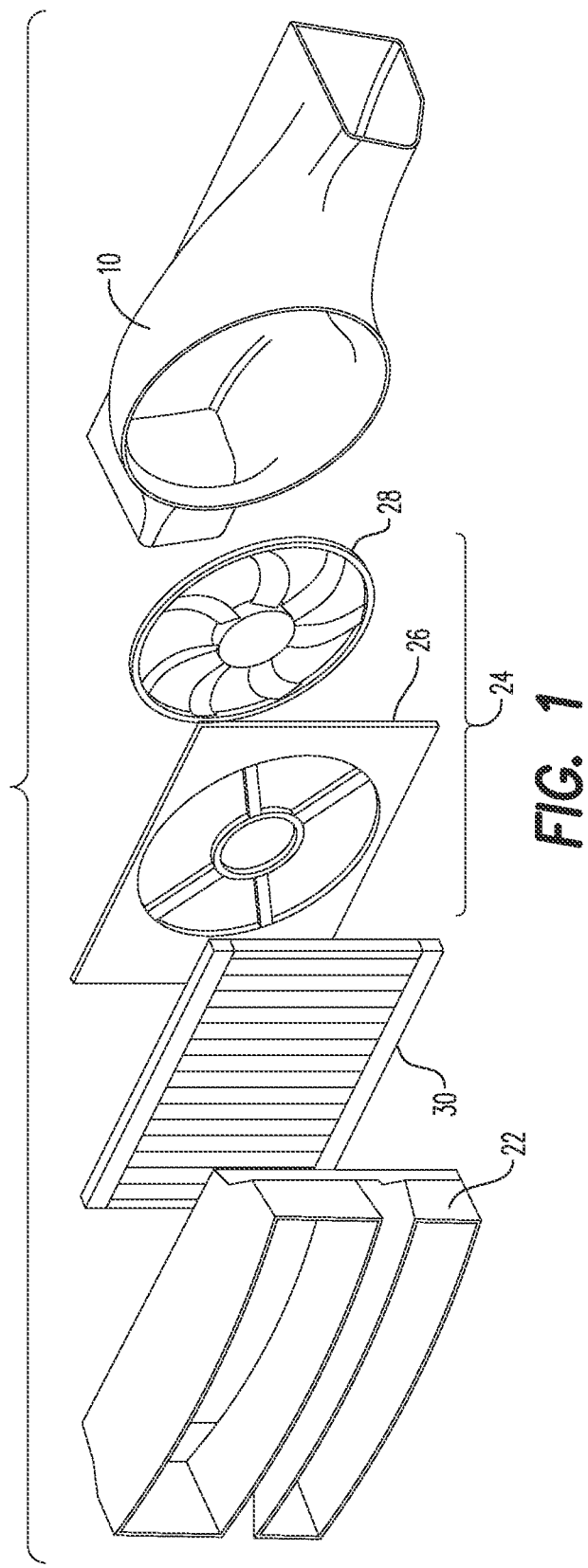
FIG. 1 illustrates an exploded schematic view of an air guide duct for a vehicle according to a first exemplary embodiment of the disclosure herein.

The disclosure herein is directed to an air guide duct for discharge of air flow from the cooling fan assembly into at least one of the wheel wells of a motor vehicle. While the use of a radiator duct to discharge air flow into the top or through the hood of an engine compartment is known, as is the conventional use of wheel wells to discharge the engine compartment air flow, it has not previously been contemplated to use the wheel wells in conjunction with an air guide duct to improve the both the aerodynamics and thermodynamics of a vehicle.

Referring to FIGS. 1-3 and FIG. 11, a first exemplary embodiment of an air guide duct for a vehicle is shown generally by reference numeral 10. The air guide duct 10 is disposed under the hood 18 of a motor vehicle 12, generally between the air intake guide 22 and the motor 20, such that the air guide duct 10 receives the discharge air flow from a cooling system having at least one cooling fan assembly 24 in the front compartment 14 of the vehicle 12 and discharges the air flow into the wheel wells 16*a*, 16*b*. The cooling fan assembly 24 generally includes a fan shroud 26 and a fan 28 to assist with air flow. The vehicle 12 also includes a heat exchanger assembly 30 within the front compartment 14 of the vehicle 12.

According to the first exemplary embodiment of the disclosure, air guide duct 10 includes an air inlet opening 32 defining a first air flow dimension, an air guide body portion 34 and opposing air outlet openings 36*a*, 36*b* each defining a second air flow dimension which discharge the air flow into a respective wheel well 16*a*, 16*b*. The air inlet opening 32 is disposed forward of the front wheel wells 16*a*, 16*b* and the opening 32 is facing the front end of the motor vehicle 12. Hence, air enters through the air intake guide 22 on the front end 38 of the vehicle 12 and is drawn or sucked through the heat exchanger 30 by the fan assembly 24. The air inlet 32 then receives the discharge air flow A1 from the fan assembly 24 such that the air guide duct 10 defines the air flow path through the front compartment 14. More particularly, the air guide duct 10 directs the air flow laterally outward, i.e., substantially perpendicular to the longitudinal axis of the vehicle, to the air outlets 36*a*, 36*b* which discharge the air flow A2 through an inboard side surface 17*a*, 17*b* of the respective wheel wells 16*a*, 16*b*, inboard of the tires 40. In this exemplary embodiment of the disclosure, there is a substantially perpendicular component of the discharge air flow impacting the side face of the tire and wheel. One skilled in the art will appreciate that such interaction of the discharge air with the tire and wheel will impair the aerodynamics of the vehicle. Accordingly, the air guide duct according to the disclosure herein is configured to achieve a balance between the angle of discharged air flow impinging upon the wheel and tire and the desired aerodynamic and thermodynamic performance of the vehicle.

As one skilled in the art will appreciate, depending on the configuration of the fan assembly and heat exchanger, air could also be pushed through the heat exchanger if the fan assembly was positioned in front of the heat exchanger. In either scenario, the prescribed air flow path defined by the air guide duct 10 isolates the cooling air flow and prevents it from contacting components within the front end compartment. It also reduces air flow losses and improves aerodynamic drag of the vehicle. The air guide duct 10 provides these improvements these while simultaneously not impacting the exterior styling of the vehicle. Also, with respect to the air flow dimensions defined above, the first and second air flow dimensions may be different or they may be the same. In the exemplary embodiment, the first air flow dimension is greater than the second air flow dimension but, in some instances, it may be beneficial to have the second air flow dimension be greater than the first air flow dimension.

Figure 4:
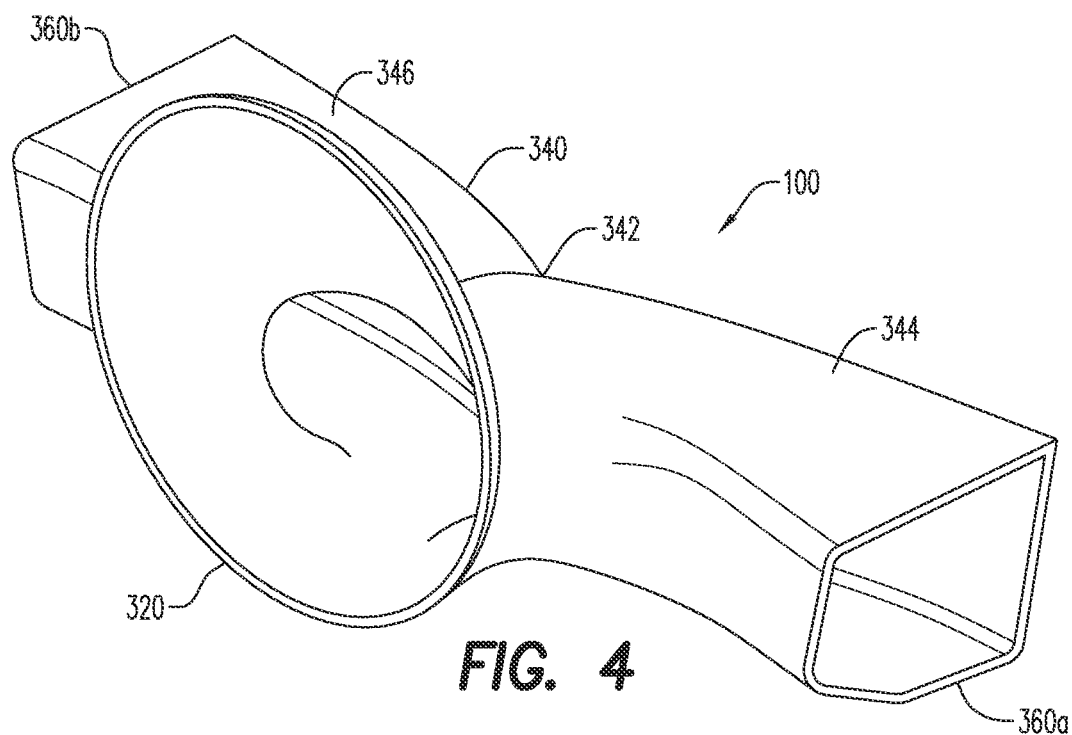
FIG. 4 is a perspective view of an air guide duct for a vehicle according to a second exemplary embodiment of the disclosure herein.

The air guide duct 10 is configured to provide maximized air mass flow through the body portion 34. However, depending upon the particular vehicle design and number of components in the front compartment 14 of the vehicle 12, there may not always be sufficient space to accommodate the body portion 34 of air guide duct 10. In such a situation, the air guide duct can also be packaged to take into consideration the space constraints within the front compartment of a vehicle. Accordingly, with reference to FIG. 4, a second exemplary embodiment of the disclosure herein provides an air guide duct 100 providing a more compact overall configuration which has a reduced air mass flow relative to that of air guide duct 10. Air guide duct 100 is particularly useful when the area under the hood in the front compartment is also used for a storage compartment or to house other components such as harnesses, wiring, drive-train components, pumps, and the like. Air guide duct 100 includes an air inlet 320 defining a first air flow dimension, a body portion 340, and opposing air outlets 360*a*, 360*b* each defining a second air flow dimension. In this instance, the body portion 340 is "pinched" so as to decrease the overall vertical dimension of the air guide duct 100 adjacent the air inlet 320 and thereby define a third air flow dimension. In the exemplary embodiment herein, the third air flow dimension is less than the first and second air flow dimensions. The pinch 342 is provided in the central area of the body portion 340 generally midway between air outlets 360*a* and 360*b*. The pinch 342 thus forms a first body portion 344 leading to air outlet 360*a* and a second body portion 346 leading to air outlet 360*b*. Similar to the first exemplary embodiment of air guide duct 10, the air inlet opening 320 is disposed forward of the front wheel wells 16*a*, 16*b* and the opening 320 is facing the front end of the motor vehicle 12. Hence, air enters through the air intake guide 22 on the front end 38 of the vehicle 12 and is drawn or sucked through the heat exchanger 30 by the fan assembly 24. The air inlet 320 then receives the discharge air flow from the cooling system including the fan assembly 24 such that the air guide duct 100 defines the air flow path through the front compartment 14. More particularly, the pinch 342 of the air guide duct 100 directs the air flow laterally outward from the air inlet 320, through the first and second body portions 344, 346, and to the air outlets 360*a*, 360*b* which discharge the air flow into the respective wheel wells 16*a*, 16*b* inboard of the tires 40. As one skilled in the art will appreciate, depending on the configuration of the fan assembly and heat exchanger, air could also be pushed through the heat exchanger if the fan assembly was positioned in front of the heat exchanger. Further, the shape of the overall air duct package can be sized, formed, and positioned for use in conventional internal combustion motor vehicles as well as electric vehicles. Moreover, depending upon the specific vehicle constraints, the body portion 344 and body portion 346, as well as the air outlets 360*a*, 360*b*, do not necessarily have to be symmetrical in size and configuration.

Figure 5:
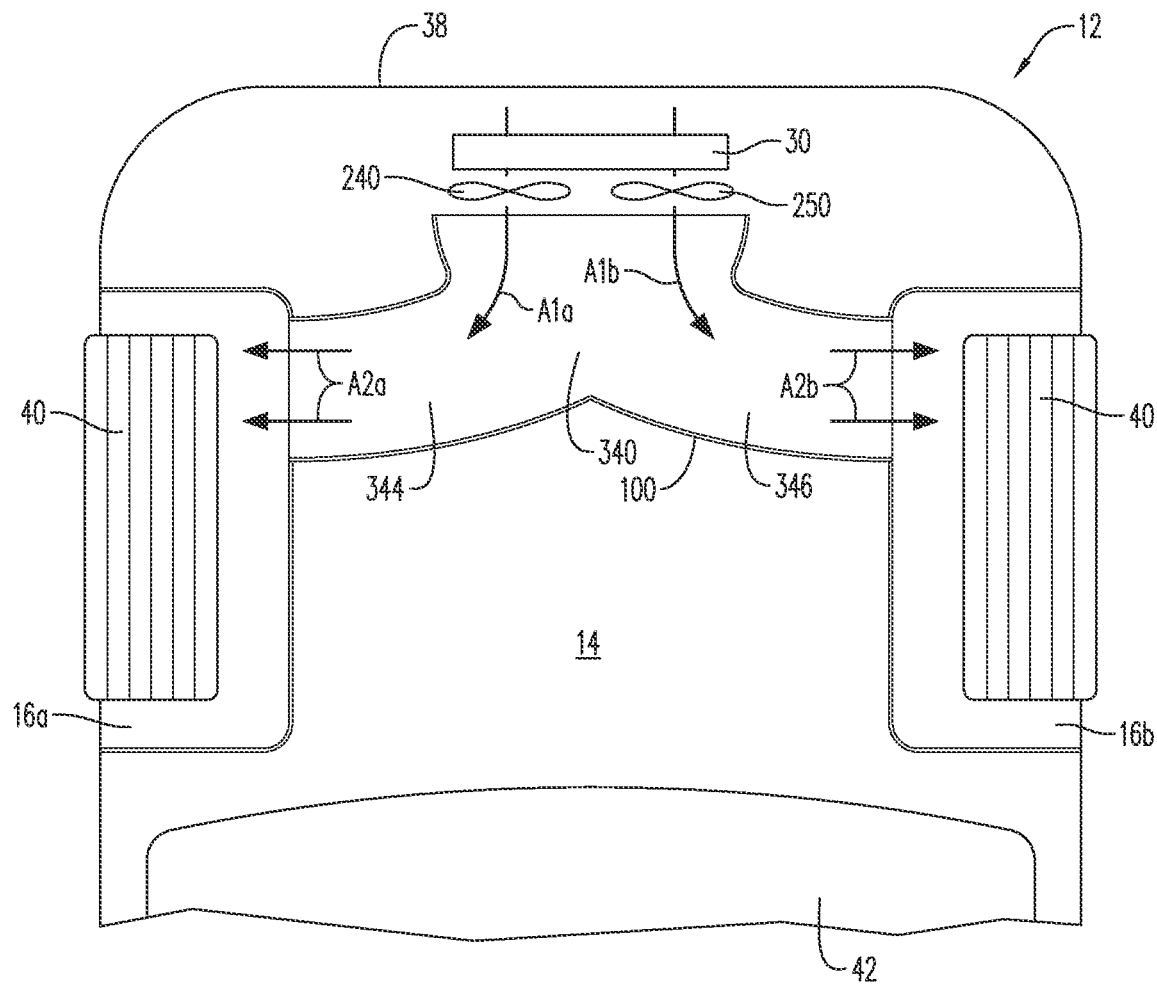
FIG. 5 is a schematic view of the air guide duct in a vehicle according to the second exemplary embodiment of the disclosure herein.

In each of the first and second exemplary embodiments described above, a fan assembly 24 is provided to draw the air flow through the heat exchanger 30 and then discharge the air flow into the air guide duct 10, 100. Another aspect of the disclosure herein further improves this operation by providing more than one fan assembly in the cooling system so as to increase the air mass flow rate. As illustrated in FIG. 5, a third exemplary embodiment of the disclosure provides a first fan assembly 240 and second fan assembly 250 utilized in connection with the air guide duct 100. Hence, air enters through the air intake guide 22 on the front end 38 of the vehicle 12 and is drawn or sucked through the heat exchanger 30 by the fan assemblies 240, 250. The air inlet 32 then receives the discharge air flow A1a from the cooling system including the fan assembly 240 and the discharge air flow A1b from the fan assembly 250 such that the air guide duct 100 defines the air flow path through the front compartment 14. In this instance, the air flows A1a and A1b from the fan assemblies 240, 250, respectively, are merged together within the body portion 340 of air guide duct 100 and air flow A2a and A2b is directed laterally outward through first body portion 344 and second body portion 346 to the air outlets 360a, 360b which discharge the air flow A2a and A2b into the respective wheel wells 16a, 16b inboard of the tires 40. FIG. 5 is shown with air guide duct 100 being used together with first and second fan assemblies 240, 250, but one skilled in the art will appreciate that more than one fan assembly could also be provided for use with air guide duct 10.

Figure 6:
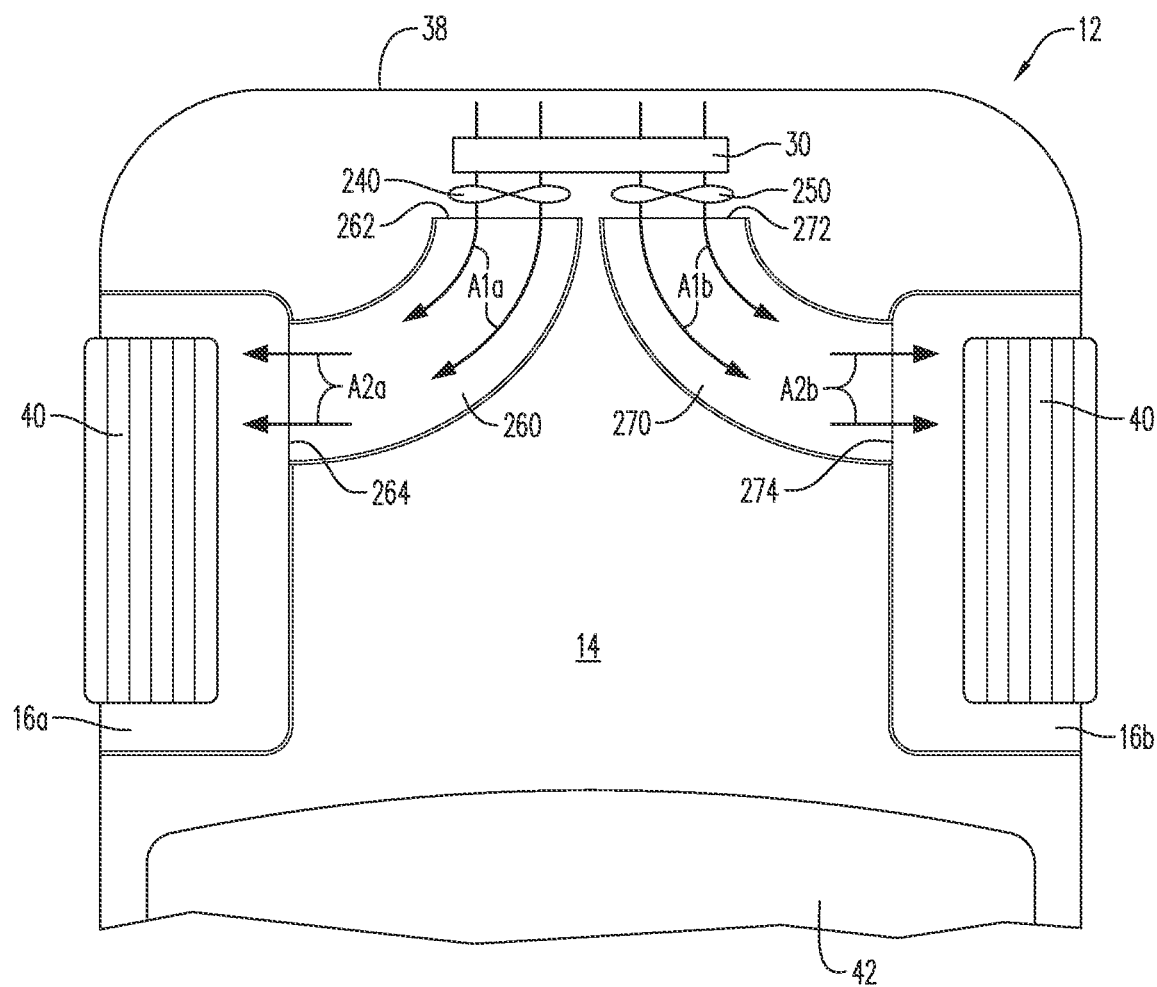
FIG. 6 is a schematic view of an air guide duct in a vehicle according to a third exemplary embodiment of the disclosure herein.

A further exemplary embodiment of the disclosure utilizing a cooling system having first and second fan assemblies 240, 250 is shown in FIG. 6. In this fourth embodiment of the disclosure, a first air guide duct 260 and a second air guide duct 270 are provided. First air guide duct 260 receives the air discharged from the first fan assembly 240 and directs the air flow to be discharged into the wheel well 16a. Second air guide duct 270 receives the air discharged from the second fan assembly 250 and directs the air flow to be discharged into the wheel well 16b. In this embodiment, the air flow A1a from the first fan assembly 240 and the air flow A1b from the second fan assembly 250 do not merge. Rather, the air inlet 262 on first air guide duct 260 receives the discharge air flow A1a from the fan assembly 240 and directs the air to the air outlet 264 which discharges the air flow A2a into wheel well 16a. Similarly, the air inlet 272 on the second air guide duct 270 receives the discharge air flow A1b from the fan assembly 250 and directs the air to the air outlet 274 which discharges the air flow A2b into the wheel well 16b.

In each of the above described embodiments, the inner surface of the air duct 10, 100, 260, 270 may be smooth (slick) or portions of the interior of the duct may have a textured surface or feature configured to impact the flow of the air therethrough. While the following FIGS. 7-9 utilize air guide duct 10 to illustrate examples of texturing and features that can be applied to the inner duct surface, one skilled in the art will understand that such texturing and features can be provided on any of the exemplary air guide ducts embodiments disclosed herein.

Figure 7:
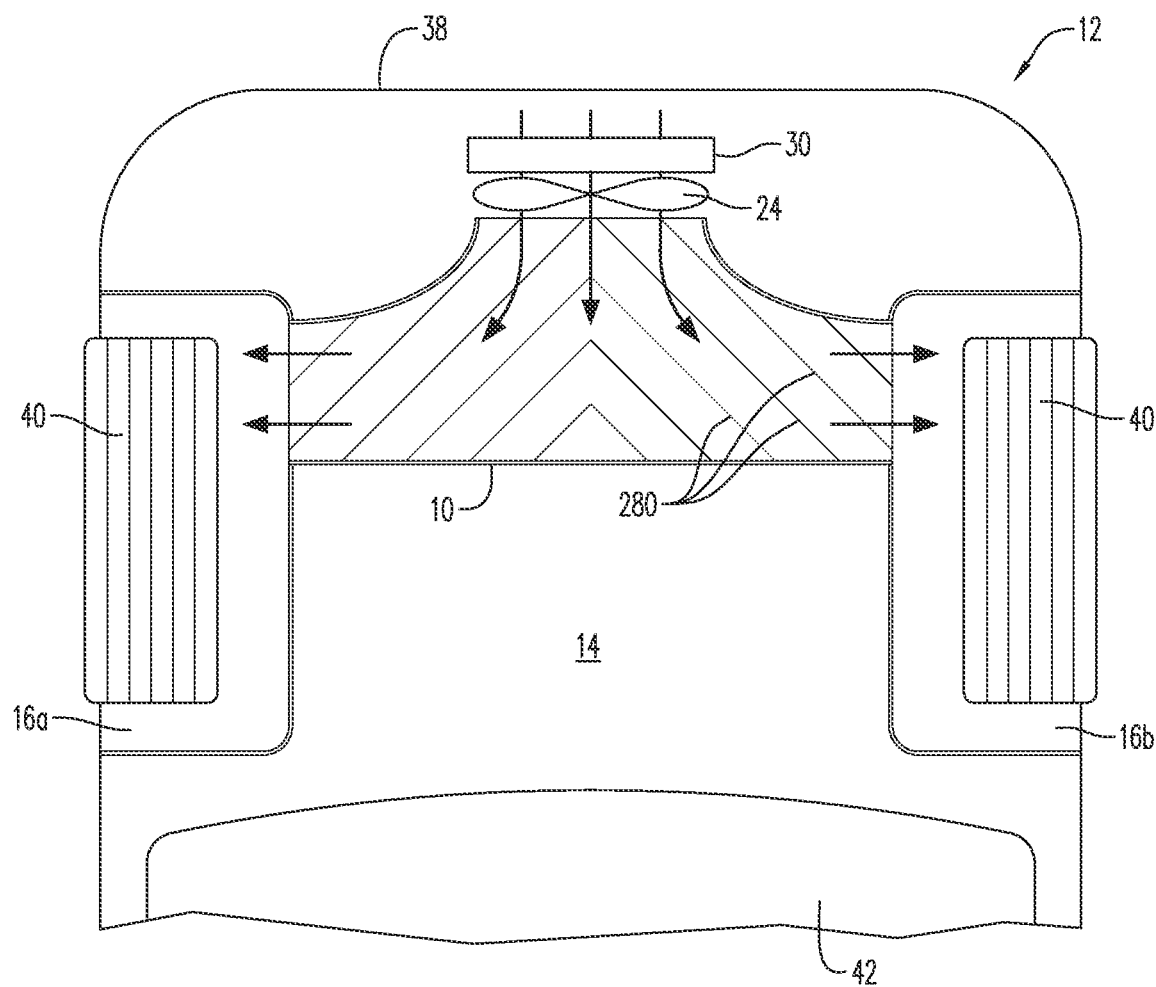
FIG. 7 is a schematic view of an air guide duct in a vehicle according to a fourth exemplary embodiment of the disclosure herein.

More particularly, FIG. 7 schematically illustrates a texture pattern 280 lining portions of the interior surface of the air guide duct 10. The texture pattern 280 can include, by way of nonlimiting example, a rifled (spiral) surface, a dimpled surface (circular in shape or otherwise), steps, fins, ribs, grooves, vortex generators, or any other geometry that is capable of locally energizing and changing the rotationality or angularity of the airflow and/or directing airflow through the air guide duct. The texture pattern 280 can be provided along the path of the airflow, across the path of the airflow, or anywhere therebetween as necessary to create the desired aerodynamic flow from the air inlet to the one or more air outlets.

Figure 8:
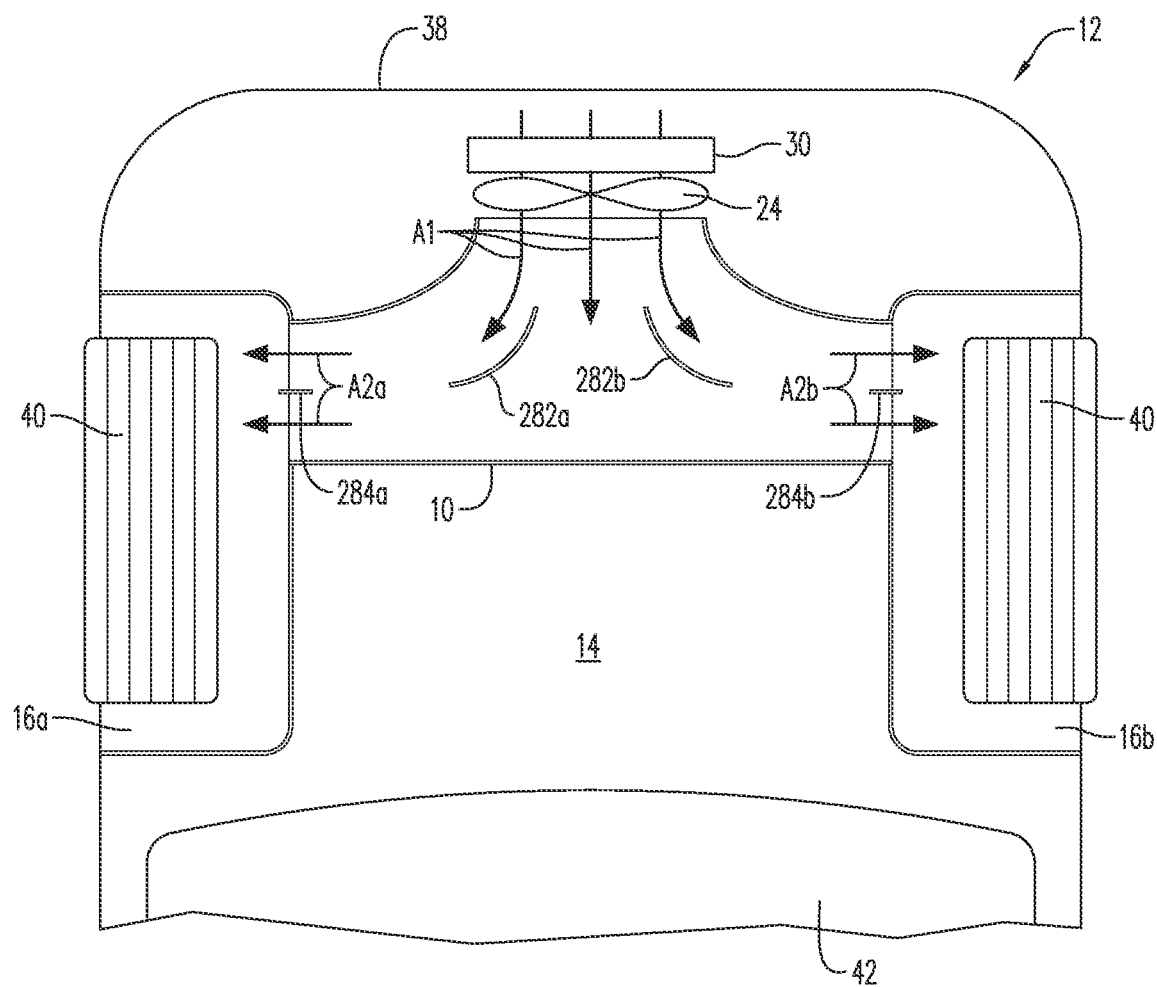
FIG. 8 is a schematic view of an air guide duct in a vehicle according to a fifth exemplary embodiment of the disclosure herein.

Referring also to FIG. 8, airflow directionality is improved by providing body guide vanes 282a, 282b within the body portion 34 of the air duct. In the exemplary embodiment disclosed herein, the guide vanes 282a, 282b have a curved configuration to assist incoming air flow A1 to be redirected laterally to one or more of the wheel wells 16a, 16b. That is, a portion of air flow A1 is redirected along guide vane 282a in order to be more efficiently directed to wheel well 16a and a further portion of air flow A1 is redirected along guide vane 282b in order to be more efficiently directed to wheel well 16b. According to an exemplary embodiment of the disclosure, the guide vanes 282a, 282b extend along the entire cross-sectional height of the air guide duct, although this is not absolutely necessary and guide vanes having a lesser height can of course also be used. Still further, each of the air duct outlets 36a, 36b (see FIG. 3) may also include an outlet guide vane 284a, 284b, respectively. The outlet guide vanes 284a, 284b assist in providing a smooth air flow A2a, A2b from the guide duct into the respective wheel wells.

Figure 9:
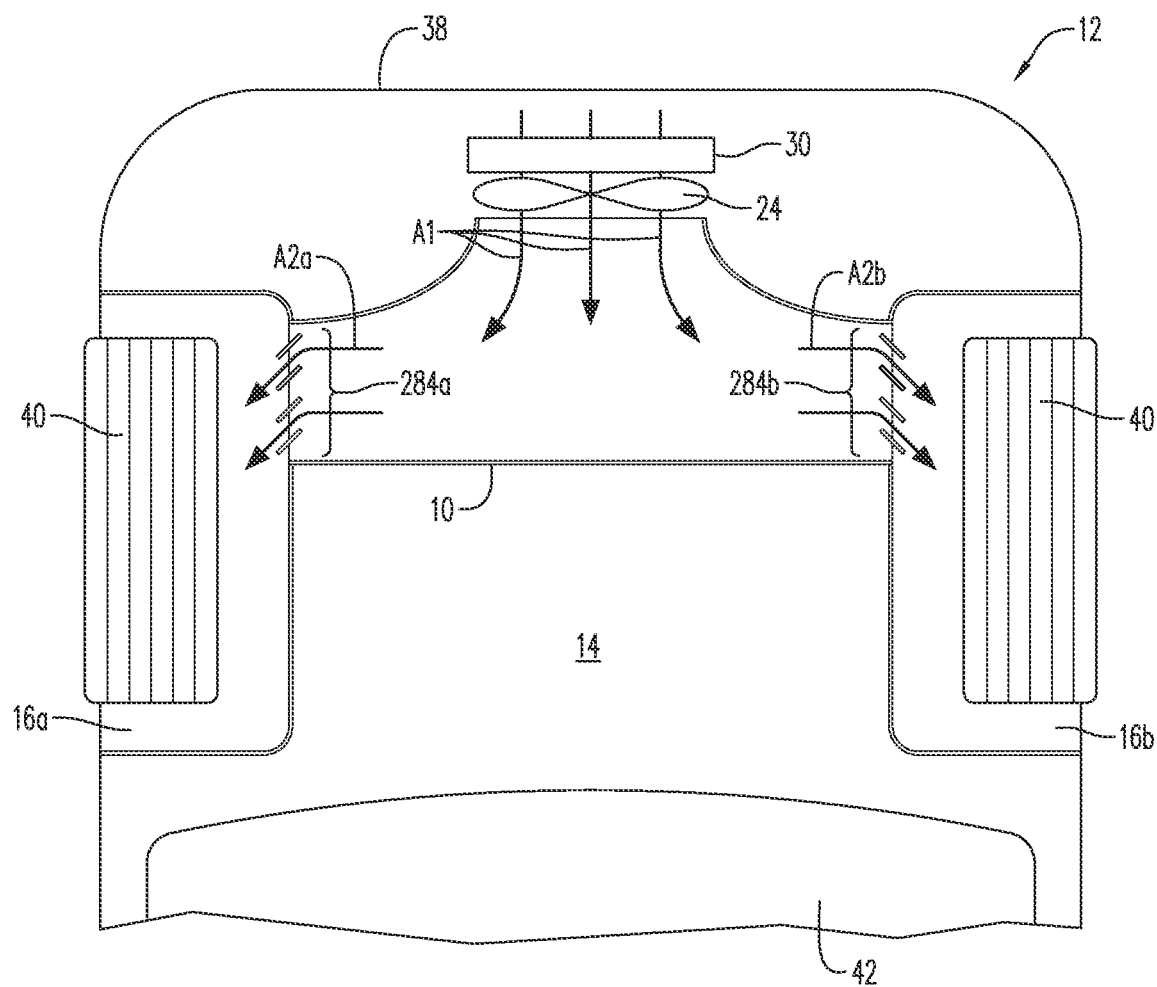
FIG. 9 is a schematic view of an air guide duct in a vehicle according to a sixth exemplary embodiment of the disclosure herein.

Similar to the above-described embodiment and with reference also to FIG. 9, airflow directionality and flow dynamics can also be improved by providing louvres 286a, 286b within the air duct outlets 36a, 36b. The louvres 286a, 286b assist in providing a smoother discharge of air flow A2a, A2b exiting from the guide duct into the respective wheel wells 16a, 16b and can also direct the outlet air in a predetermined direction. By way of example, the louvres 286a, 286b may be disposed in a horizontal orientation similar to the outlet guide vanes discussed above, or the louvres 286a, 286b may be disposed in a predetermined angled position relative to the longitudinal axis of the vehicle, such as the rearwardly direction illustrated in FIG. 9. The louvres 286a, 286b may be provided with a fixed angle, i.e., not movable, or they may also be movable to the desired angle.

Figure 10:
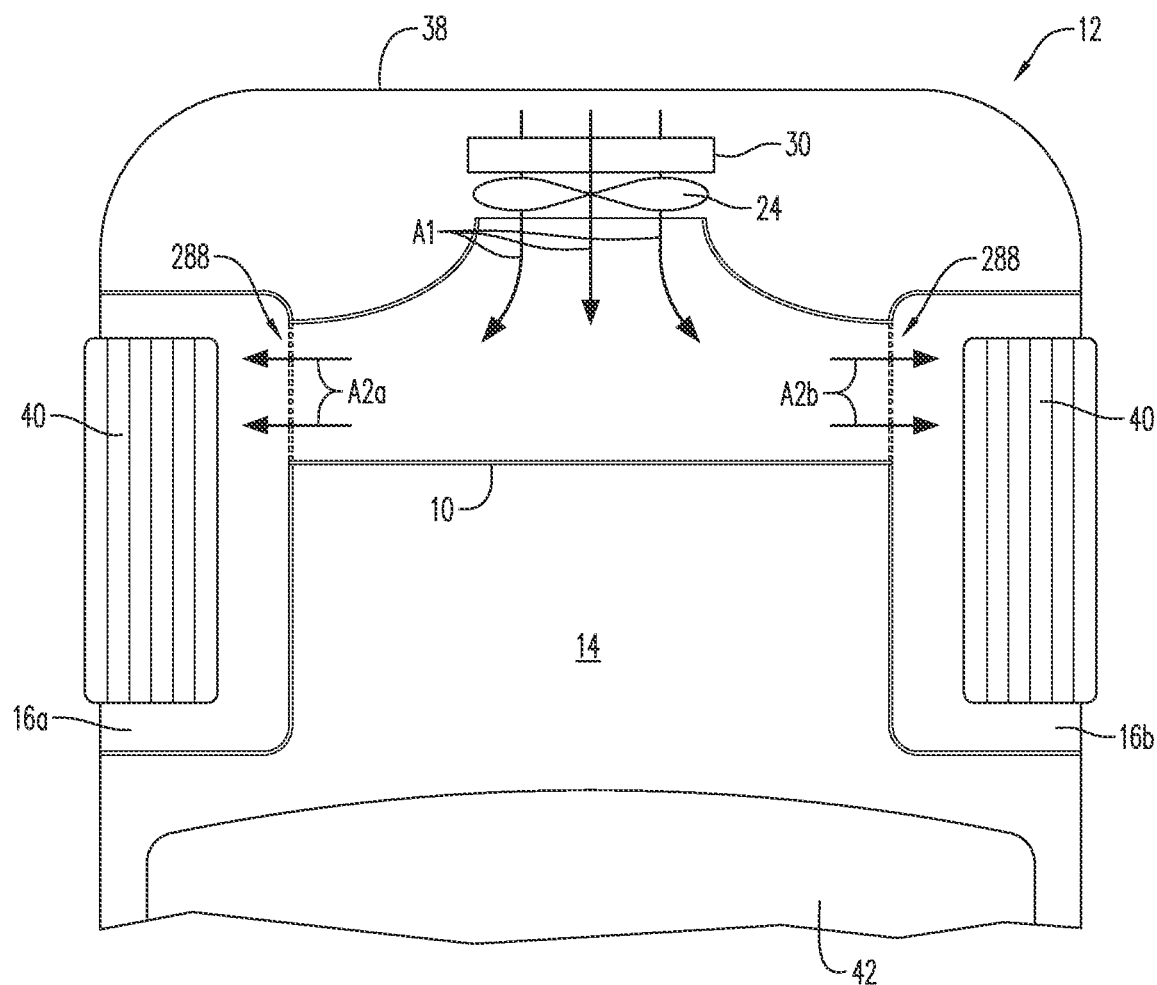
FIG. 10 is a schematic view of an air guide duct in a vehicle according to a seventh exemplary embodiment of the disclosure herein.
Figure 11:
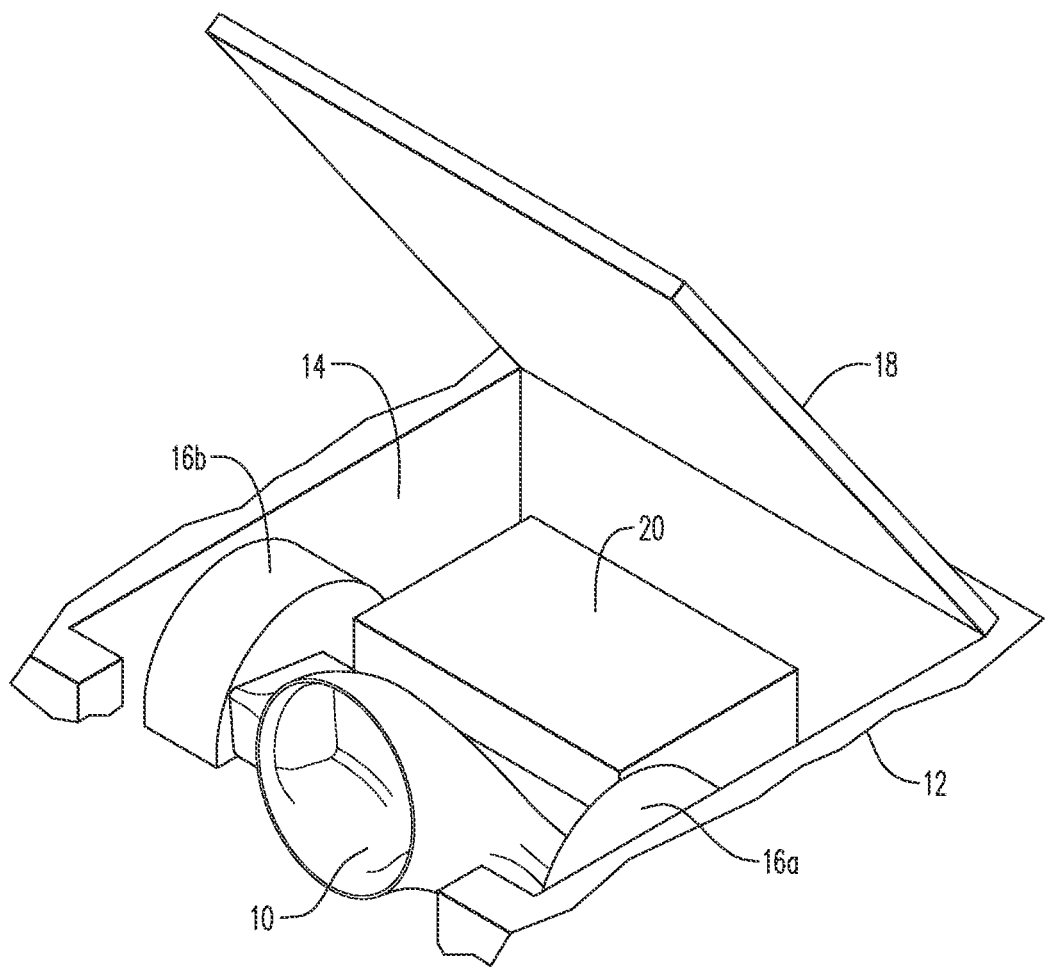
FIG. 11 is a schematic perspective view of the air guide duct in a vehicle according to the first embodiment of the disclosure herein, with certain components removed for clarity.

Because the discharge from the air duct is in fluid communication with the wheel wells 16a, 16b through the air duct outlets 36a, 36b, it is possible that the rotating tires could cause stones, road debris or the like to be thrown towards the air duct outlets 36a, 36b. The air duct outlets 36a, 36b also make the internal air guide duct components vulnerable to rodents and other small pests entering the air guide duct. In order to avoid any such adverse matter or life form from entering into the air duct, a protective covering 288 can be applied across the discharge opening of the air duct outlets 36a, 36b, as shown in FIG. 10. The protective covering 288 can include a mesh, net, wire, webbing or similar covering having openings sufficient to allow the air to be discharged out from the air duct outlets 36a, 36b while still substantially preventing the intrusion of any type of object or life form that could cause potential harm to the air duct or vehicle. The material from which protective covering 288 is made is not particularly limited and can include metal, plastic, rubber or any material capable of performing the necessary function.

Figure 2:
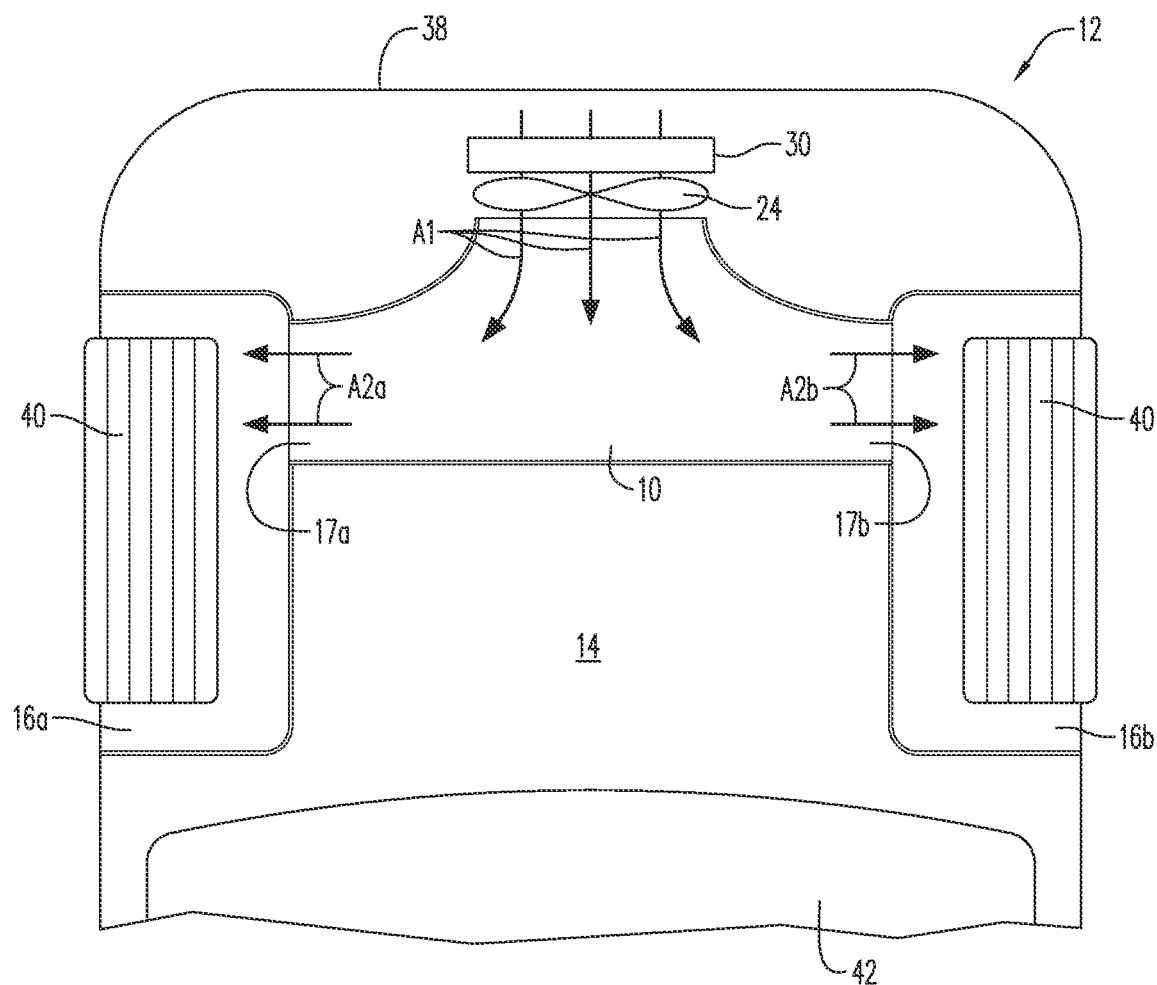
FIG. 2 is a schematic top view of the air guide duct in a vehicle according to the first embodiment of the disclosure herein.
Figure 3:
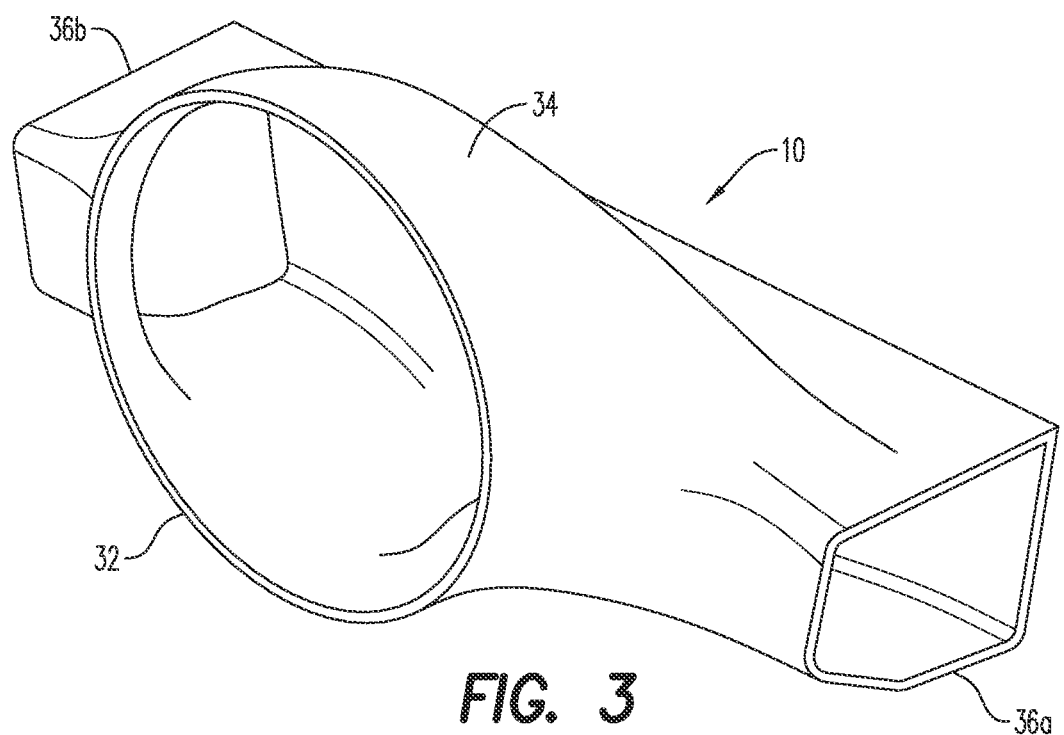
FIG. 3 is an enlarged perspective view of the air guide duct shown in FIG. 1.
Figure 12:
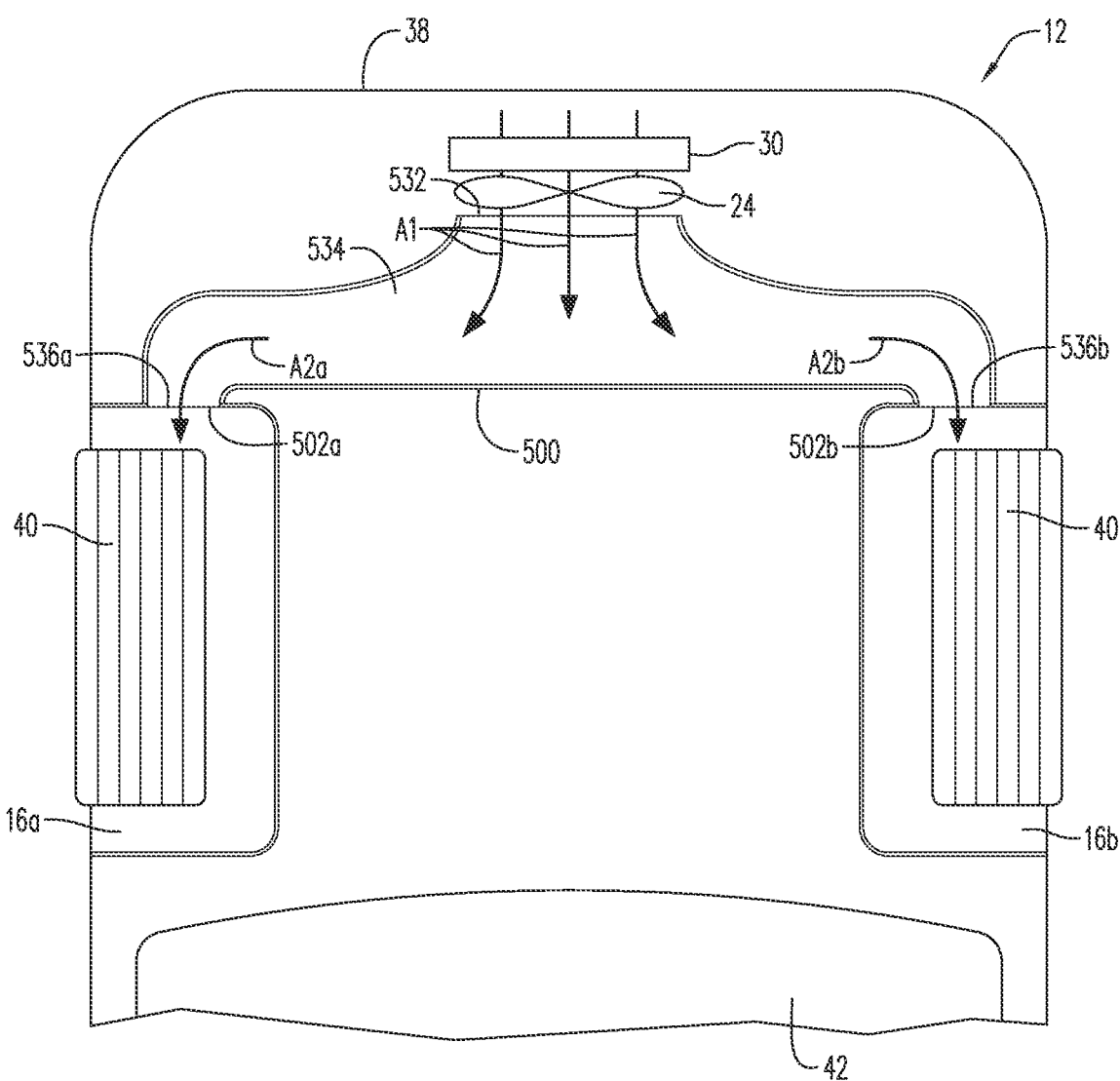
FIG. 12 is a schematic view of an air guide duct in a vehicle according to an eighth exemplary embodiment of the disclosure herein.

In each of the above exemplary embodiments, the air guide duct directs the air flow laterally outward from the air inlet 32 toward the air outlets 36a, 36b which discharge the air flow through an inboard side surface 17a, 17b of the respective wheel wells 16a, 16b, inboard of the tires 40 (see FIG. 2). However, in accordance with the disclosure herein, the air guide duct can also discharge the air flow into the wheel wells through other surfaces besides or in addition to the inboard side surfaces. Referring to FIG. 12, a further exemplary embodiment of the disclosure is shown generally by air guide duct 500. Air guide duct 500 includes an air inlet opening 532, an air guide body portion 534 and opposing air outlet openings 536a, 536b which discharge the air flow into a respective wheel well 16a, 16b. The air inlet opening 532 is disposed forward of the front wheel wells 16a, 16b and the opening 532 is facing the front end 38 of the motor vehicle 12. Hence, air enters through the air intake guide on the front end 38 of the vehicle 12 and is drawn rearward through the heat exchanger 30 by the fan assembly 24. The air inlet 32 then receives the discharge air flow A1 from the fan assembly 24 such that the air guide duct 500 defines the air flow path through the front compartment. More particularly, the air guide duct 500 directs the air flow laterally outward from the air inlet 532 towards the air outlets 536a, 536b which discharge the air flow A2 substantially parallel to a longitudinal axis of the vehicle through a forward surface 502a, 502b of the respective wheel wells 16a, 16b. The discharged air thus may impinge on a forward facing surface of the tires 40.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

We claim:

1. A motor vehicle comprising: a front end; a pair of opposing front wheel wells rearward of the front end; a heat exchanger and at least one fan assembly for promoting air flow through the heat exchanger; and an air guide duct having at least one air inlet disposed forward of the front wheel wells and facing the front end of the motor vehicle, the air guide duct further having at least one air outlet opening into at least one of the front wheel wells such that incoming air from the front end of the motor vehicle is guided into at least one of the front wheel wells; wherein the air guide duct directs air flow discharged from the heat exchanger wherein incoming air from the front end of the motor vehicle is discharged through an inboard side surface of the at least one front wheel well substantially perpendicular to a longitudinal axis of the motor vehicle.

2. The motor vehicle according to claim 1, further comprising a heat exchanger and at least one fan assembly for promoting air flow through the heat exchanger, wherein the air guide duct directs air flow discharged from the heat exchanger into at least one of the front wheel wells.

3. The motor vehicle according to claim 2, wherein the at least one fan assembly comprises a first fan assembly and a second fan assembly and the at least one air inlet comprises a first air inlet and a second air inlet, air flow through the first fan assembly configured to flow through the first air inlet and be guided into one of the pair of opposing front wheel wells and air flow through the second fan assembly configured to flow through the second air inlet and be guided into another one of the pair of opposing front wheel wells.

4. The motor vehicle according to claim 1, wherein an inner surface of the air guide duct includes a textured surface.

5. The motor vehicle according to claim 4, wherein the textured surface of the inner surface of the air guide duct includes one or more of a vortex generator, steps, dimples, rifling, ribs, and fins.

6. The motor vehicle according to claim 1, wherein an inner surface of the air guide duct includes a plurality of guide vanes disposed to direct incoming air from the at least one air inlet towards the at least one air outlet and into at least one of the front wheel wells.

7. The motor vehicle according to claim 1, wherein the at least one air outlet includes louvers configured to direct air flow into at least one of the front wheel wells.

8. The motor vehicle according to claim 1, wherein the at least one air outlet includes a protective mesh between the air outlet opening and a respective front wheel well.

9. The motor vehicle according to claim 1, wherein the at least one air inlet defines a first flow area dimension and the at least one air outlet defines a second flow area dimension, wherein the air guide duct further includes a pinched region defining a third flow area dimension, the third flow area dimension being less than the first flow area dimension and the second flow area dimension.

10. The motor vehicle according to claim 1, wherein the at least one air outlet includes an air discharge that opens through an inboard side surface of at least one of the front wheel wells.

11. The motor vehicle according to claim 1, wherein at least one air outlet includes an air discharge that opens through a front surface of at least one of the front wheel wells.

12. An air guiding system for a motor vehicle having a pair of opposing front wheel wells, the air guiding system comprising: an air guide duct having only one air inlet defining a first air flow dimension and configured to be disposed forward of the front wheel wells and facing a front end of the motor vehicle, the air guide duct further having a first air outlet and an opposing second air outlet each defining a second air flow dimension, the first air outlet configured to discharge air into one of the pair of opposing front wheel wells and the second air outlet configured to discharge air into another of the pair of opposing front wheel wells such that incoming air is guided into the pair of opposing front wheel wells; wherein air is discharged through an inboard side surface of each of the pair of opposing front wheel wells substantially perpendicular to a longitudinal axis of the motor vehicle.

13. The air guiding system according to claim 12, wherein the first air flow dimension is greater than the second air flow dimension.

14. The air guiding system according to claim 12, wherein air is discharged through an inboard side surface of each of the pair of opposing front wheel wells substantially perpendicular to a longitudinal axis of the motor vehicle.

15. The air guiding system according to claim 12, wherein an inner surface of the air guide duct includes a plurality of guide vanes disposed to direct incoming air from the at least one air inlet towards the first and second air outlets.

16. The air guiding system according to claim 12, wherein the first and second air outlets include louvers configured to direct air flow into the front wheel wells.

17. The air guiding system according to claim 12, wherein each of the first and second air outlets includes a protective mesh configured to be between an air outlet opening and the front wheel wells.

18. The air guiding system according to claim 12, wherein the air guide duct further includes a pinched region defining a third air flow dimension, the third flow dimension being less than the first flow dimension and the second flow dimension.

19. A method for guiding air flow through a front end of a motor vehicle, comprising: discharging air flow passing through a heat exchanger into an air guide duct; directing air flow from at least one air inlet of the air guide duct which faces the front end of the motor vehicle, through a body of the air guide duct, and towards at least two opposing air outlets of the air guide duct; discharging air flow from each of the at least two opposing air outlets into a respective wheel well of the motor vehicle; wherein directing air flow from at least one air inlet comprises directing air flow from only a single air inlet of the air guide duct, through a body of the air guide duct, and towards at least two opposing air outlets of the air guide duct.

20. The method for guiding air flow according to claim 19, wherein directing air flow from at least one air inlet comprises directing air flow from only a single air inlet of the air guide duct, through a body of the air guide duct, and towards at least two opposing air outlets of the air guide duct.

\* \* \* \* \*